(12) United States Patent
Kraus et al.

(10) Patent No.: US 10,588,266 B2
(45) Date of Patent: *Mar. 17, 2020

(54) STRATEGIC BALE PLACEMENT DEVICE

(71) Applicant: Deere & Company, Moline, IL (US)

(72) Inventors: Timothy J. Kraus, Blakesburg, IA (US); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 270 days.

This patent is subject to a terminal disclaimer.

(21) Appl. No.: 15/817,587

(22) Filed: Nov. 20, 2017

(65) Prior Publication Data

US 2018/0070535 A1    Mar. 15, 2018

Related U.S. Application Data

(62) Division of application No. 14/332,445, filed on Jul. 16, 2014, now Pat. No. 9,877,433.

(51) Int. Cl.
| | | |
|---|---|---|
| *A01F 15/08* | (2006.01) | |
| *A01F 15/07* | (2006.01) | |
| *A01D 85/00* | (2006.01) | |

(52) U.S. Cl.
CPC ............ *A01F 15/08* (2013.01); *A01D 85/005* (2013.01); *A01F 15/07* (2013.01);
(Continued)

(58) Field of Classification Search
CPC .................. A01F 15/07; A01F 15/0883; A01F 2015/0808; A01F 15/106; A01F 15/0875; A01F 2015/074; A01D 90/08; A01D 90/083; A01D 85/005; A01D 2085/007; A01D 90/12; A01D 85/00; A01D 87/127; A01D 59/00; B65B 61/28
(Continued)

(56) References Cited

U.S. PATENT DOCUMENTS

| | | | |
|---|---|---|---|
| 5,822,967 A | 10/1998 | Hood et al. | |
| 6,272,825 B1 * | 8/2001 | Anderson | ............. A01F 15/085 100/88 |

(Continued)

FOREIGN PATENT DOCUMENTS

| | | |
|---|---|---|
| FR | 2679410 A1 | 1/1993 |
| JP | 2003143927 A | 5/2003 |

(Continued)

OTHER PUBLICATIONS

European Search Report in foreign counterpart application No. 15176485.9 dated Dec. 14, 2015 (9 pages).

*Primary Examiner* — Jimmy T Nguyen

(57) ABSTRACT

An agricultural baler comprising a baler mechanism. The agricultural baler comprises at least one structural member and a first ground engaging support is pivotally coupled to the structural member about a pivotal axis. A second ground engaging support is rotationally coupled to the structural member about an aft rotational axis. The baler mechanism is pivotally connected to the structural member at a baler connection. The baler connection is located at least one of between the aft rotational axis and the pivotal axis and at the pivotal axis. A bale carriage is coupled to the structural member.

18 Claims, 3 Drawing Sheets

(52) U.S. Cl.
    CPC ...... *A01F 15/0875* (2013.01); *A01F 15/0883* (2013.01); *A01D 2085/007* (2013.01)

(58) Field of Classification Search
    USPC .......... 100/7, 88, 188 R; 414/111, 489, 491; 56/341
    See application file for complete search history.

(56) References Cited

U.S. PATENT DOCUMENTS

| | | | |
|---|---|---|---|
| 6,421,996 B1 * | 7/2002 | Deutsch | A01D 46/084 100/88 |
| 7,000,533 B2 | 2/2006 | Derscheid et al. | |
| 7,401,547 B2 | 7/2008 | Degen | |
| 8,707,865 B2 * | 4/2014 | Oakes | A01F 15/106 100/35 |
| 9,877,433 B2 * | 1/2018 | Kraus | A01F 15/0883 |
| 2004/0134177 A1 | 7/2004 | Viaud | |
| 2004/0250703 A1 | 12/2004 | Viaud et al. | |
| 2006/0278103 A1 | 12/2006 | Derscheid | |
| 2007/0209530 A1 | 9/2007 | Viaud | |

FOREIGN PATENT DOCUMENTS

| | | |
|---|---|---|
| PL | 158422 B1 | 9/1992 |
| WO | 0101755 A1 | 1/2001 |
| WO | 2008059354 A1 | 5/2008 |
| WO | 2014031355 A1 | 2/2014 |

\* cited by examiner

STRATEGIC BALE PLACEMENT DEVICE

CROSS-REFERENCE TO RELATED APPLICATIONS

This application is a divisional of U.S. application Ser. No. 14/332,445, filed Jul. 16, 2014, titled Strategic Bale Placement Device, which is incorporated herein by reference.

FIELD OF THE DISCLOSURE

The present disclosure relates generally to crop harvesting systems. More particularly this disclosure relates to crop harvesting systems employing a harvester and an accumulator for accumulating crop.

BACKGROUND OF THE DISCLOSURE

A cut and raked crop that has been dried or otherwise prepared in a field, such as hay, straw or other agricultural material is often gathered, compressed and shaped by an agricultural baler. There are several types of balers that are commonly used, each resulting in different types of bales. Some are rectangular and some are cylindrical of various sizes. Bales can be bound with netting, strapping, wire or traditionally twine using a tie system to connect ends of the twine. Large square balers often use a double tie knotting system or double tie knotter. The double tie knotter ties two knots, one to complete the previous bale, and another to start the next or current bale. Twine is then directly fed out of the twine spools during bale formation. A typical large square bale weighs between 800 and 1,600 pounds and is often dropped in the field by the baler for later retrieval, as the baling system proceeds though the field.

A baler that produces small rectangular bales, often also called square bales, produce bales that are typically wrapped with two strands of knotted twine. The bales are light enough for easy handling and typically weigh from 40 to 80 pounds each. A bale is formed by a series of processes performed by the square baler including lifting the windrowed material, hereinafter referred to as hay, by way of the pickup portion of the baler. The hay is then moved by way of an auger into a chamber that has a feeding fork. The feeding fork moves the hay in front of a sliding plunger with a cutting edge that cuts the hay and moves the hay in the chamber into previously packed hay therein causing the hay to be compressed. Once a predetermined amount of hay has been gathered in the chamber, as measured by the amount being extruded through the opening at the rear of the chamber, a mechanism is triggered causing the twine to be threaded through the hay, cut and then knotted thereby forming the bale and one portion of the twine is retained to start to receive hay for the next bale. As the bales are moved through the compression channel out to the rear of the baler, the baled hay is then often loaded onto a wagon, dropped into the field for later retrieval, or moved to a towed bale accumulator.

Round balers rotate gathered crop material until a sufficiently large enough cylinder-shaped "round" or "rolled" bale is formed and that bale is secured with twine or wrapping. The back of the baler swings open, allowing the bale to be discharged. Variable-chamber balers typically produce bales from 48 to 72 inches in diameter and up to approximately 62 inches in width. The bales can weigh from 1,000 to 2,200 pounds, depending upon size, material, and moisture content.

Crop accumulators are known which group the bales while the baling operation is underway. When the crop accumulator is full, it is common to dump the harvested crop in the location where it is full. For example, a crop accumulator, which looks somewhat like a trailer is connected directly behind the baler and may collect and transport three round bales, allowing groupings of up to four bales at a time (counting the bale in the baler). These type of crop accumulators, accumulate the bales in a sequential manner relative to the general direction of travel of the baler. The crop accumulator may have a floor chain system in order to move the bale that it receives from the baler to a sequential position on the accumulator. These crop accumulators may, depending upon the load distribution, produce either an upward or downward force at the connection point of the baler, which thereby imparts a moment or torque on the baler, which can result in an upward force being applied to the hitch of the tractor and thereby cause instability or damage to the baler's hitch.

SUMMARY OF THE DISCLOSURE

In one embodiment, an agricultural baler is disclosed. The agricultural baler comprises a baler mechanism. The agricultural baler comprises at least one structural member and a first ground engaging support is pivotally coupled to the structural member about a pivotal axis. A second ground engaging support is rotationally coupled to the structural member about an aft rotational axis. The baler mechanism is pivotally connected to the structural member at a baler connection. The baler connection is located at least one of between the aft rotational axis and the pivotal axis and at the pivotal axis. A bale carriage is coupled to the structural member.

In another embodiment, a crop accumulator that is connectable to an agricultural baler is disclosed. The baler comprises a baler mechanism and a first ground engaging support. The crop accumulator comprises at least one structural member. The first ground engaging support is pivotally coupled to the structural member about a pivotal axis. A second ground engaging support is rotationally coupled to the structural member about an aft rotational axis. The baler mechanism is pivotally connected to the structural member at a baler connection. The baler connection is located at least one of between the aft rotational axis and the pivotal axis and at the pivotal axis. A bale carriage is coupled to the structural member.

In yet another embodiment, a method for coupling a bale carriage to an agricultural baler is disclosed. The method comprises pivotally coupling at least one structural member to a first ground engaging support about a pivotal axis. A second ground engaging support is rotationally coupled to the structural member about an aft rotational axis. A baler mechanism is pivotally connected to the structural member at a baler connection. The baler connection is located at least one of between the aft rotational axis and the pivotal axis and at the pivotal axis. A bale carriage is coupled to the structural member.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION OF THE DRAWINGS

Figure 1:
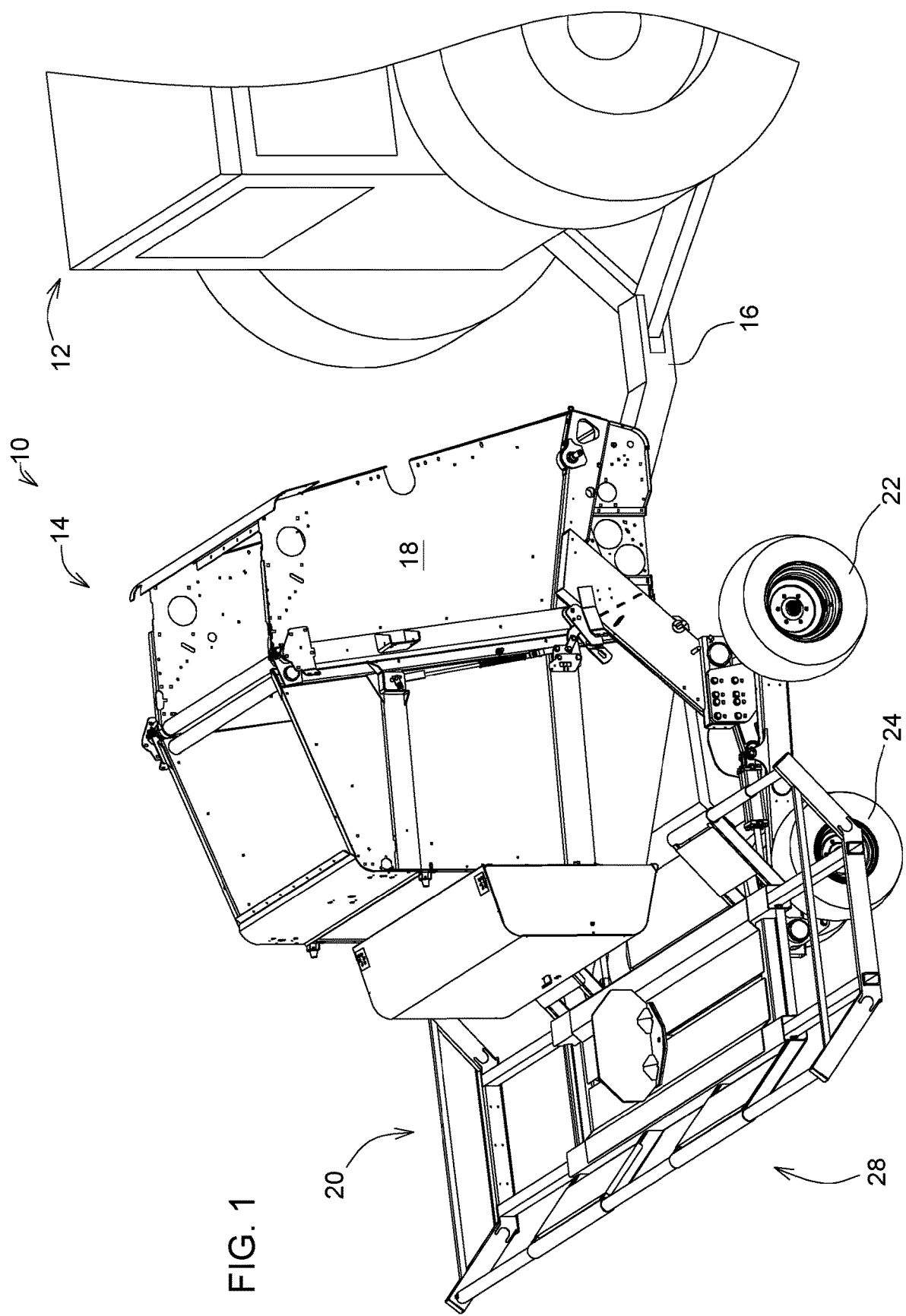
FIG. 1 is a perspective view of an agricultural baler including one embodiment of a crop accumulator.
Figure 2:
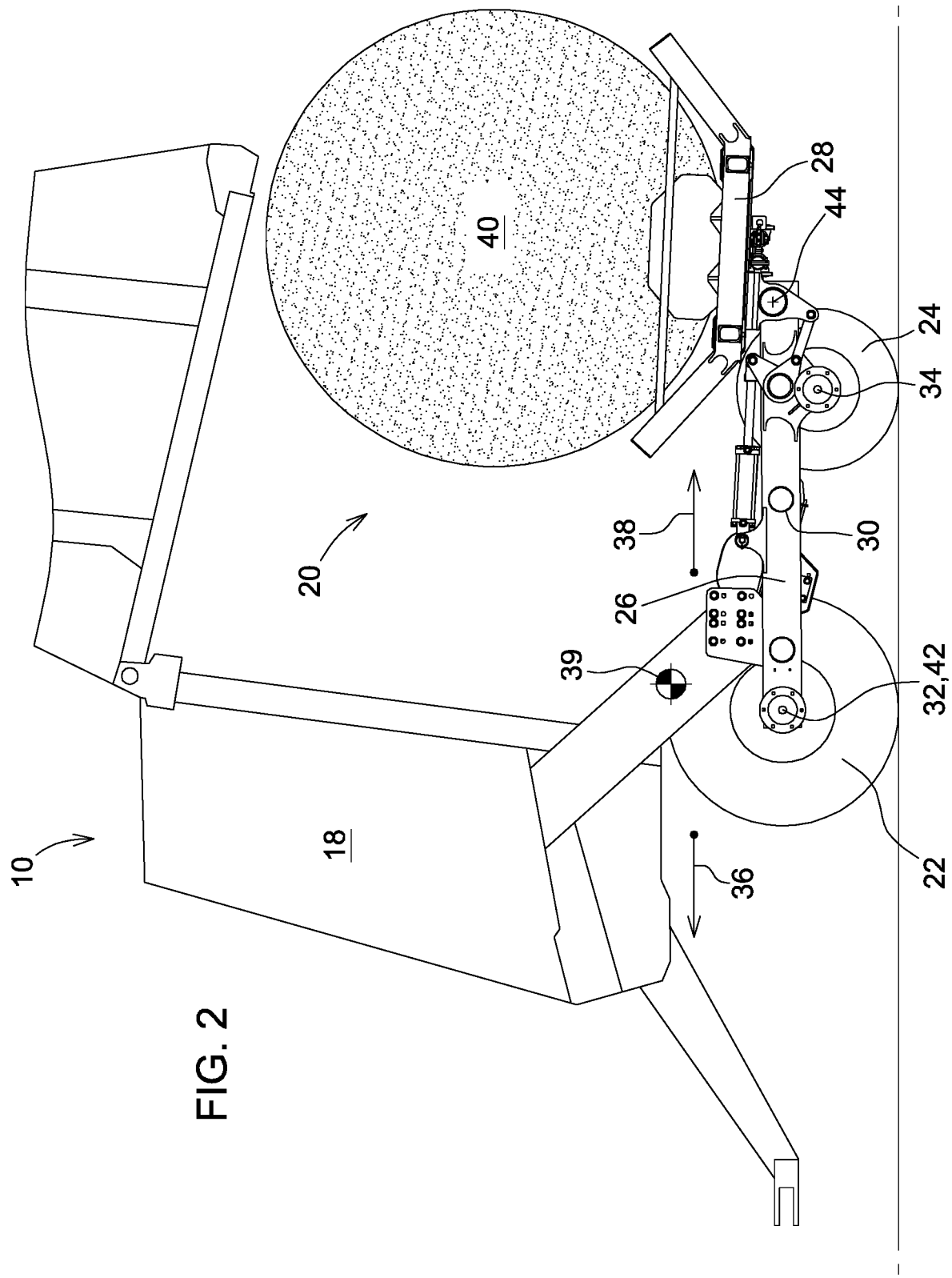
FIG. 2 is a side view of the agricultural baler of FIG. 1.

FIG. 1 illustrates a baling system 10 comprising a tractor 12 and a baler 14. The baler 14 is connected to the tractor 12 by way of hitch 16 thereby providing towing for the movement of baler 14. The baler 14 includes a baler mechanism 18, a crop accumulator 20, and at least one first ground engaging support 22. With reference to FIG. 2, the baler mechanism 18 receives crop material as the baling system 10 traverses the ground and forms a bale 40 from the crop material.

With continued reference to FIG. 2, the crop accumulator 20 includes a second ground engaging support 24, at least one structural member 26, and a bale carriage 28. The first and second ground engaging supports 22, 24 may be in the form of wheels and axles as illustrated or in some other form (e.g., a track system). The structural member 26 may be in the form of a beam and may be referred to as a walking beam construct. The baler mechanism 18 is connected to the structural member 26 at a baler connection 30, thereby transferring most of the weight of the baler mechanism 18 to the structural member 26. The structural member 26 is pivotally coupled to the first ground engaging support 22 about a pivotal axis 32. The second ground engaging support 24 is rotationally coupled to the structural member 26 about an aft rotational axis 34. In one embodiment, the baler connection 30 is located between the pivotal axis 32 and the aft rotational axis 34. More specifically, the baler connection 30 is located in a fore direction 36 from the aft rotational axis 34 and generally in an aft direction 38 of the pivotal axis 32. Alternatively, the baler connection 30 may be in line with, generally in line with, or proximate the pivotal axis 32. The baler connection 30 is a pivoting connection although it is also contemplated that baler connection 30 could also be a non-pivoting connection.

Figure 3:
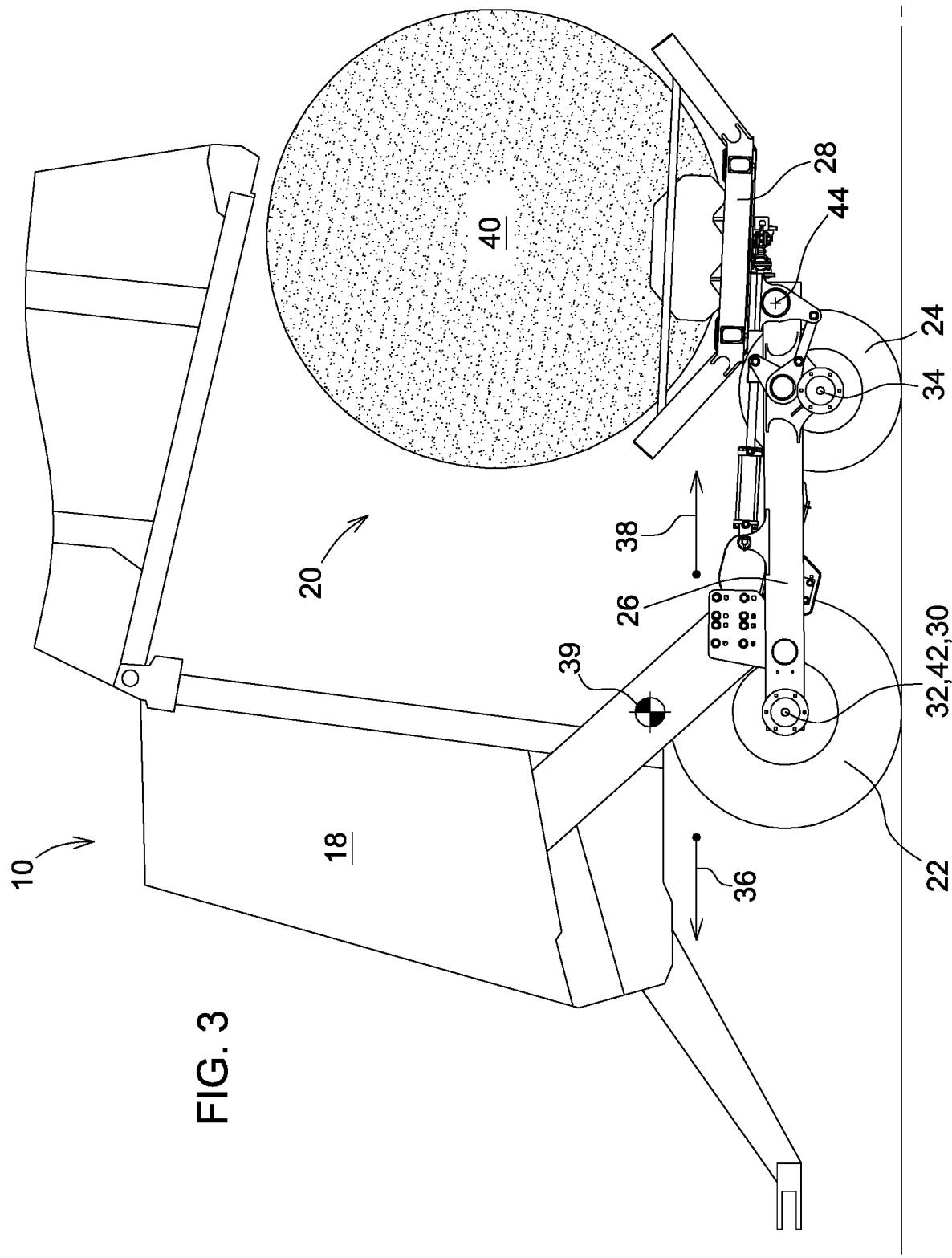
FIG. 3 is a side view of an agricultural baler according to another embodiment.

The baler 14 is supported primarily by way of the first and second ground engaging supports 22, 24 with the weight of the baler mechanism 18 being transferred to the structural member 26 by way of the baler connection 30. In the present embodiment, the Center of Gravity ("CG") 39 of the baler mechanism 18 is generally in line with pivotal axis 32 and the CG 39 will shift as the amount of crop material increases in baler mechanism 18 and as baler mechanism 18 discharges the bale 40 onto the bale carriage 28. The structural member 26 functions as a walking beam with the weight of baler mechanism 18 used to counteract the weight of the bale(s) 40 on the bale carriage 28. In one embodiment, the CG 39 is generally fore of the baler connection 30. This arrangement effective eliminates torque being applied to the hitch 16 as the bales 40 are formed and discharged to the bale carriage 28 and ultimately to the ground. In another embodiment, the CG 39 may be generally in line with the baler connection 30 (FIG. 3). The CG 39 may also be generally in line with the pivotal axis 32 and the rotational axis 42.

Although the baler connection 30 is shown apart from the pivotal axis 32, it is also contemplated that the baler connection 30 may be proximate to the pivotal axis 32 (FIG. 3). Further, the pivotal axis 32 is shown as being substantially coaxial with a fore rotational axis 42 of the first ground engaging support 22. However, it is also contemplated that the pivotal axis 32 may be generally proximate to the fore rotational axis 42, but not coaxially located.

The bale carriage 28 is pivotally connected to the structural member 26 about a carriage axis 44 to thereby allow the bale carriage 28 to pivot to dump bales 40 that are carried thereby. Advantageously, the present invention arranges for the connection of the crop accumulator 20 to the baler mechanism 18 to be such that the weight of the baler mechanism 18 is used to counter the combined weight of the crop accumulator 20 and the bales 40 thereon, with minimal or no torque being applied to the hitch 16. Another advantage of the present invention is that the bale carriage 28 does not rotate about a vertical axis relative to the baler mechanism 18, thereby always being situated to readily receive a bale 40 from the baler mechanism 18.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Various features are set forth in the following claims.

What is claimed is:

1. An agricultural baler, comprising:
   a baler mechanism configured to receive crop material and form a bale from the crop material;
   at least one structural member;
   a first ground engaging support pivotally coupled to the structural member about a pivotal axis;
   a second ground engaging support is rotationally coupled to the structural member about an aft rotational axis, the baler mechanism being pivotally connected to the structural member at a baler connection located at the pivotal axis; and
   a bale carriage coupled to the structural member.

2. The agricultural baler of claim 1, wherein the first ground engaging support has a fore rotational axis, the fore rotational axis of the first ground engaging support and the pivotal axis being substantially coaxially located.

3. The agricultural baler of claim 1, wherein the first ground engaging support has a fore rotational axis, the baler mechanism having a center of gravity generally aligned with the fore rotational axis.

4. The agricultural baler of claim 3, wherein the bale carriage is pivotally coupled to the structural member.

5. The agricultural baler of claim 4, wherein the center of gravity is located proximate to the baler connection.

6. The agricultural baler of claim 4, wherein the pivotal axis and the fore rotational axis of the first ground engaging support are generally coaxial.

7. A crop carriage assembly connectable to an agricultural baler having a first ground engaging support and a baler mechanism configured to receive crop material and form a bale from the crop material, the carriage assembly comprising:

at least one structural member, the first ground engaging support being pivotally coupled to the structural member about a pivotal axis;

a second ground engaging support rotationally coupled to the structural member about an aft rotational axis, the baler mechanism being pivotally connected to the structural member at a baler connection located at the pivotal axis; and a bale carriage coupled to the structural member.

8. The carriage assembly of claim 7, wherein the first ground engaging support has a fore rotational axis, the fore rotational axis and the pivotal axis being substantially coaxially located.

9. The carriage assembly of claim 7, wherein the first ground engaging support has a fore rotational axis, the baler mechanism having a center of gravity generally aligned with the fore rotational axis.

10. The carriage assembly of claim 9, wherein the bale carriage is pivotally coupled to the structural member.

11. The carriage assembly of claim 10, wherein the center of gravity is located proximate to the baler connection.

12. The carriage assembly of claim 10, wherein the pivotal axis and the fore rotational axis of the first ground engaging support are generally coaxial.

13. A method for coupling a bale carriage to an agricultural baler, the method comprising:

pivotally coupling at least one structural member to a first ground engaging support about a pivotal axis;

rotationally coupling a second ground engaging support to the structural member about an aft rotational axis;

pivotally connecting a baler mechanism to the structural member at the pivotal axis at a baler connection, wherein the baler mechanism is configured to receive crop material and form a bale from the crop material; and coupling a bale carriage to the structural member.

14. The method of claim 13, wherein the first ground engaging support has a fore rotational axis, the fore rotational axis of the first ground engaging support and the pivotal axis being substantially coaxially located.

15. The method of claim 13, wherein the first ground engaging support has a fore rotational axis, the baler mechanism having a center of gravity generally aligned with the fore rotational axis.

16. The method of claim 15, wherein the bale carriage is pivotally coupled to the structural member.

17. The method of claim 16, wherein the center of gravity is located proximate to the baler connection.

18. The method of claim 16, wherein the pivotal axis and the fore rotational axis of the first ground engaging support are generally coaxial.

* * * * *